United States Patent
Koizumi et al.

(10) Patent No.: US 12,473,875 B2
(45) Date of Patent: Nov. 18, 2025

(54) ROCKET ENGINE

(71) Applicant: THE UNIVERSITY OF TOKYO, Tokyo (JP)

(72) Inventors: Hiroyuki Koizumi, Tokyo (JP); Mariko Akiyama, Tokyo (JP); Keita Nishii, Tokyo (JP); Masaya Murohara, Tokyo (JP); Yoshihito Mannami, Tokyo (JP)

(73) Assignee: THE UNIVERSITY OF TOKYO, Tokyo (JP)

( * ) Notice: Subject to any disclaimer, the term of this patent is extended or adjusted under 35 U.S.C. 154(b) by 0 days.

(21) Appl. No.: 18/180,368

(22) Filed: Mar. 8, 2023

(65) Prior Publication Data

US 2023/0213004 A1 Jul. 6, 2023

Related U.S. Application Data

(63) Continuation of application No. PCT/JP2021/032258, filed on Sep. 2, 2021.

(30) Foreign Application Priority Data

Sep. 8, 2020 (JP) .................. 2020-150595

(51) Int. Cl.
*F02K 9/10* (2006.01)
*F02K 9/95* (2006.01)

(52) U.S. Cl.
CPC . *F02K 9/10* (2013.01); *F02K 9/95* (2013.01)

(58) Field of Classification Search
CPC ..... F02K 9/10; F02K 9/12; F02K 9/14; F02K 9/08; F02K 9/95; F02K 9/72; F02K 9/40
See application file for complete search history.

(56) References Cited

U.S. PATENT DOCUMENTS

| | | | |
|---|---|---|---|
| 3,044,252 A | 7/1962 | Zwicky | |
| 3,849,983 A * | 11/1974 | Cherry | F02K 9/40 60/39.47 |
| 4,474,140 A * | 10/1984 | Sternfeld | F02K 9/64 431/170 |
| 5,718,113 A * | 2/1998 | Hayes | F02K 9/46 60/260 |
| 2010/0251695 A1 | 10/2010 | Summers | |

(Continued)

FOREIGN PATENT DOCUMENTS

DE 19514720 A1 * 9/1995 ............... F02K 9/72
JP H04370354 A 12/1992

OTHER PUBLICATIONS

Prisniakov, V.F., et al. "Study Solid Rocket Motor with Water Injection for Emergency Rescue System", 1992, p. 1-6 (Year: 1992).*

(Continued)

*Primary Examiner* — Andrew H Nguyen
(74) *Attorney, Agent, or Firm* — CANTOR COLBURN LLP

(57) ABSTRACT

A rocket engine comprises a combustion chamber and a rocket nozzle that communicates with the combustion chamber. A metal wire supply device supplies a metal wire, which is fuel, to the combustion chamber. A water vapor generator supplies water vapor as an oxidant to the combustion chamber. An ignition device ignites the metal wire in a water vapor atmosphere.

8 Claims, 8 Drawing Sheets

(56) References Cited

U.S. PATENT DOCUMENTS

2011/0167793 A1* 7/2011 Kwon .................. F02K 9/72
60/251
2018/0273439 A1* 9/2018 Dawley .................. C06B 25/06

OTHER PUBLICATIONS

International Search Report for International Application No. PCT/JP2021/032258; Mailing Date, Oct. 19, 2021.
Li-Ya et al., "Combustion of a single magnesium particle in water vapor", Chinese Physics B, DOI: 10.1088/1674-1056/24/9/094702, Sep. 2015, 10 pages.
Miller et al., "Green Rocket Propulsion by Reaction of Al and Mg Powders and Water", 40th AIAA/ASME/SAE/ASEE Joint Propulsion Conference and Exhibit, AIAA 2004-4037, Jul. 11-14, 2004, 10 pages.
PCT International Preliminary Examination Report on Patentability with Written Opinion of the International Searching Authority for International Application No. PCT/2021/032258; Issued on Mar. 7, 2023.
JPO Notification of Reason(s) for Refusal for corresponding JP Application No. 2020-150595; Issued on May 28, 2024.

\* cited by examiner

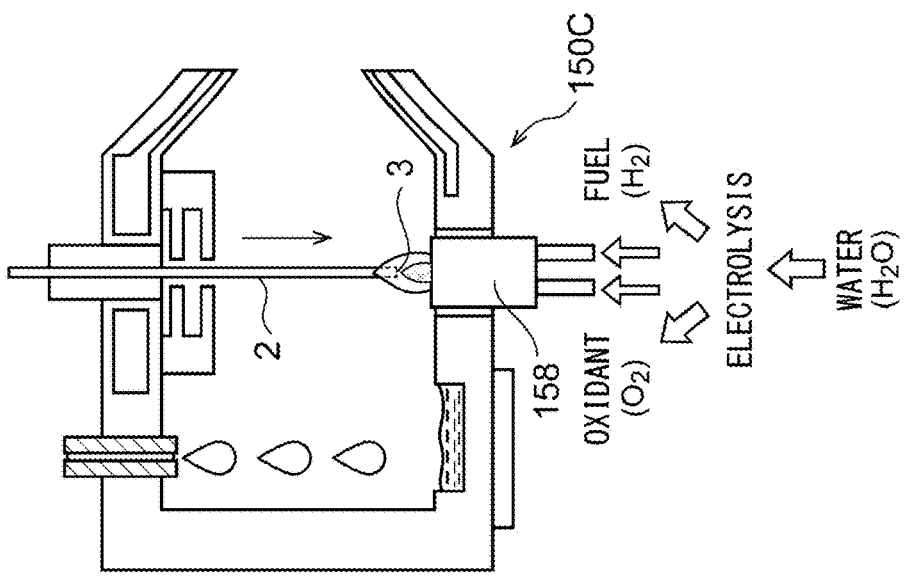
FIG. 8A INDUCTION HEATING TYPE
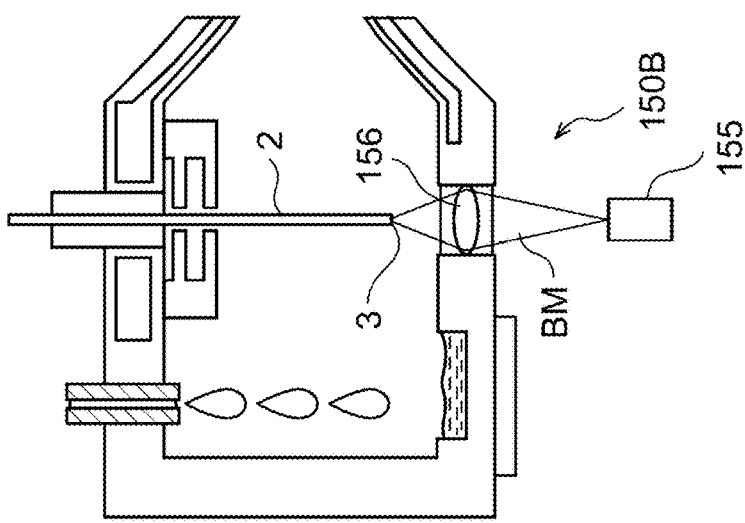
FIG. 8B LASER HEATING TYPE
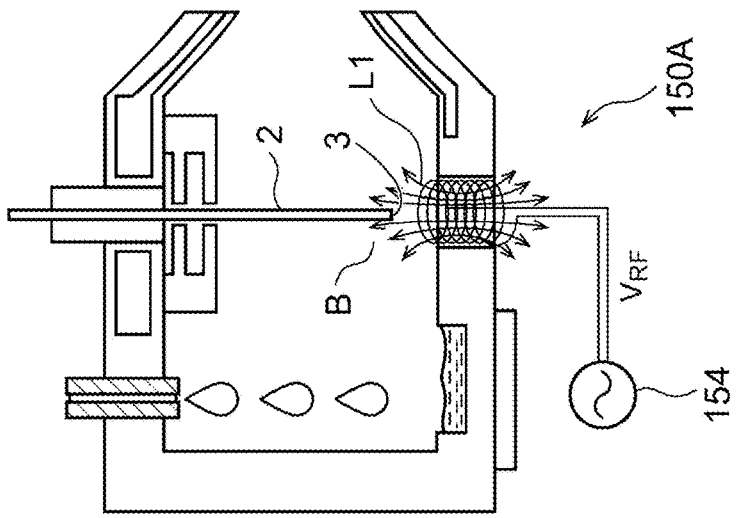
FIG. 8C GAS TORCH HEATING TYPE

ROCKET ENGINE

CROSS REFERENCE TO RELATED APPLICATIONS

This application is a continuation under 35 U.S.C. § 120 of PCT/JP2021/032258, filed Sep. 2, 2021, which is incorporated herein by reference, and which claimed priority to Japanese Application No. 2020-150595, filed Sep. 8, 2020. The present application likewise claims priority under 35 U.S.C. § 119 to Japanese Application No. 2020-150595, Sep. 8, 2020, the entire content of which is also incorporated herein by reference.

BACKGROUND

1. Technical Field

The present invention relates to a rocket engine.

2. Description of the Related Art

An engine is indispensable for a spacecraft represented by an artificial satellite or a space probe to obtain a propulsive force for propulsion. In order for the spacecraft to obtain (propel) thrust, some substance (referred to as propellant) needs to be released outside the spacecraft, and the spacecraft engine is responsible for this role.

The types of spacecraft engines are distinguished by the energy used for release. One that uses a chemical reaction is called a chemical propulsion rocket, and one that uses electricity is called an electric propulsion rocket. The former is used when a large amount of energy (large thrust) is required in a short time, and the latter is used when acceleration with a small amount of propellant is required even for a long time.

In a chemical propulsion rocket, fuel and an oxidant for generating a reaction are generally required. On the ground, only the fuel is transported, and oxygen in the atmosphere is used as the oxidant, but in space, it is necessary to transport both. Since both are reacted (combusted) violently due to the process of mixing and ignition, in general, both or one of the fuel and the oxidant of a chemical propulsion rocket is often a highly reactive substance, that is, a dangerous substance. Exemplary chemical propulsion rockets combine hydrazine and dinitrogen tetroxide. Such a dangerous substance can be managed and handled in a large-scale project mainly by a country or a large company but is extremely difficult to handle in a small-scale project mainly by a venture company or a university. In addition, such small scale projects often utilize rideshare with large satellites and other small satellites, and risk management for other satellites is more strictly required. Furthermore, even when using space infrastructure such as a space station, dangerous substances are a major restriction. Further, in future space development, in-situ resource utilization (ISRU) of propellants is regarded as important, but existing chemical propulsion rocket technology does not satisfy such ISRU.

SUMMARY

The present disclosure has been made in such a situation, and one of exemplary purposes of the present disclosure is to provide a chemical propulsion rocket capable of selecting a safe fuel and oxidant.

A rocket engine according to one aspect of the present disclosure includes a combustion chamber, a metal wire supply device that supplies a metal wire to the combustion chamber, a water vapor generator that supplies water vapor to the combustion chamber, an ignition device that ignites the metal wire, and a rocket nozzle that communicates with the combustion chamber.

Note that arbitrary combinations of the above components and modifications of the expressions of the present invention between devices, methods, systems, and the like are also effective as aspects of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 8A to FIG. 8C are views illustrating an ignition device according to a first modification.

DETAILED DESCRIPTION

Overview of Embodiment

Figure 1:
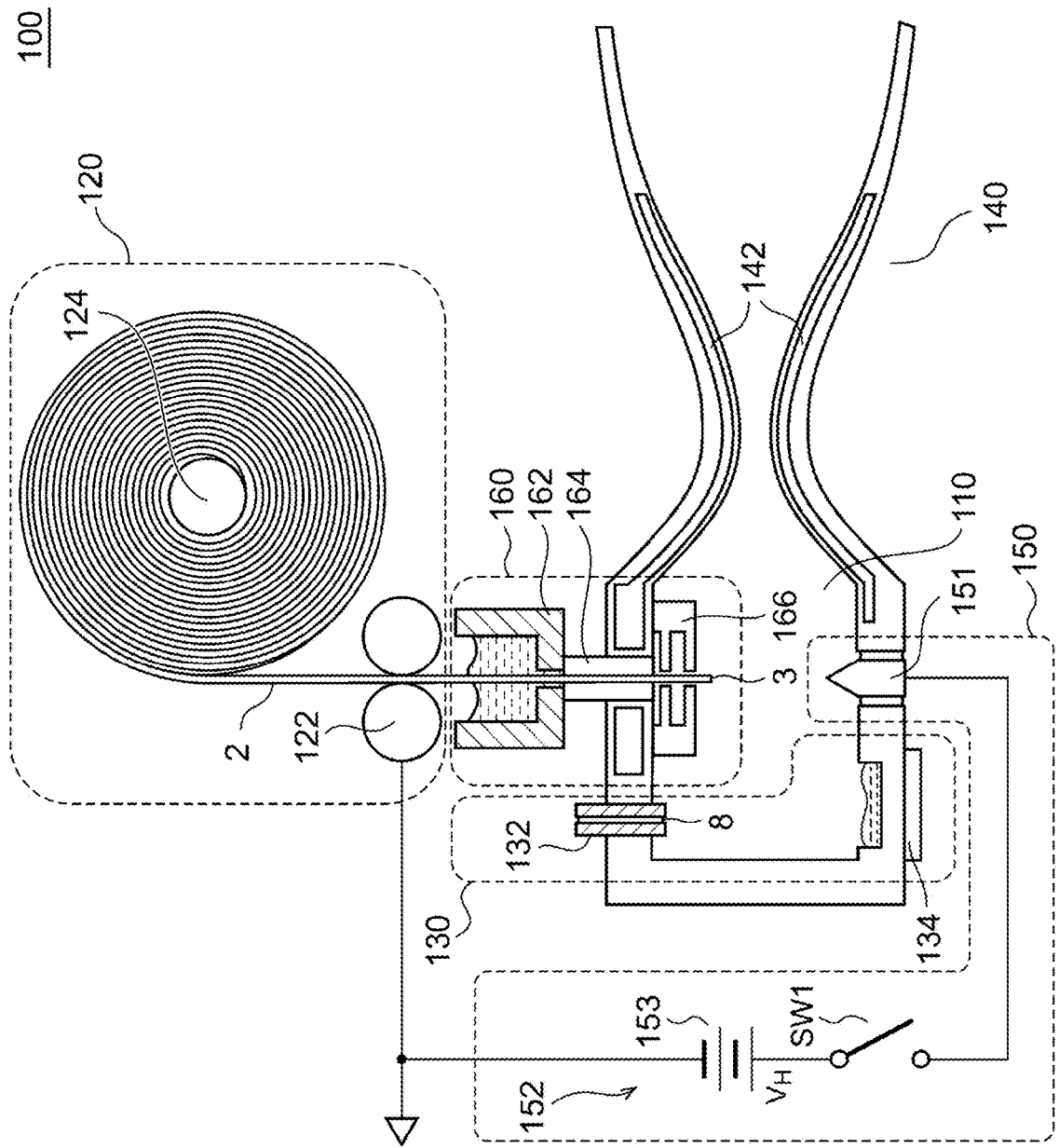
FIG. 1 is a diagram illustrating a rocket engine according to an embodiment.

An overview of some example embodiments of the present disclosure will be described. This overview describes some concepts of one or more embodiments in a simplified manner for the purpose of basic understanding of the embodiments as a prelude to the detailed description that follows and does not limit the breadth of the invention or disclosure. Also, this overview is not a comprehensive overview of all possible embodiments and does not limit the essential components of the embodiments. For convenience, "one embodiment" may be used to refer to one embodiment (example or modification) or a plurality of embodiments (examples or modifications) disclosed in the present specification.

A rocket engine according to an embodiment includes a combustion chamber, a metal wire supply device that supplies a metal wire to the combustion chamber, a water vapor generator that supplies water vapor to the combustion chamber, an ignition device that ignites the metal wire, and a rocket nozzle that communicates with the combustion chamber.

The use of the metal wire causes a reaction (including combustion) between the metal and water vapor to occur at a wire tip and a side surface. In the case of using a lump as the metal, since the thermal conductivity of the metal is high, even if a reaction occurs at a certain point, heat is three-dimensionally dissipated (or can be said to be due to the size of the heat capacity of the lump), so that it is difficult to maintain the temperature for self-combustion. In this rocket engine, the use of the wire makes it possible to one-dimensionally suppress the escape of heat and maintain the temperature for self-combustion in the vicinity of the wire tip. On the other hand, an existing technique using powder as metal is known. In this case, it is also possible to suppress dissipation due to thermal conduction. However, the use of powder has a disadvantage that it is necessary to mount a carrier gas for supply and it is difficult to predict powder supply under a minute weight. Further, there is a disadvantage that the powder metal itself is classified as a dangerous substance in the first place. The combustion of the wire tip in the rocket engine according to an embodiment solves the existing problems in terms of combustion maintenance and safety.

The metal wire may be any one of magnesium, a magnesium alloy, aluminum, and an aluminum alloy. These elements are stably present by being covered with an oxide layer at room temperature, but intensely react with the surrounding oxidant (water vapor or the like) as the oxide layer is broken in a high-temperature atmosphere. Therefore, these elements are elements that are safe at room temperature and can be used as a fuel for chemical propulsion.

Needless to say, the water used as an oxidant is a safe substance. Therefore, realizing combustion in combination of both by the metal wire mechanism has an effect of imparting safety to the chemical propulsion rocket. Furthermore, light metal elements such as magnesium and aluminum are present in a large amount as oxides in outer space (Moon, asteroids, and Mars), and water is also attracting attention as a substance that can be collected in space. It can therefore be said that this rocket engine is a chemical propulsion rocket which is compatible with the conditions of the future ISRU.

In one embodiment, the metal wire supply device may accommodate the metal wire in a state of being wound around a reel. Accordingly, transportation, storage, and management of the metal wire can be simplified.

In one embodiment, the rocket engine may include a sealing mechanism provided in an insertion portion of the combustion chamber in which the metal wire is inserted.

In one embodiment, the ignition device may include an electrode disposed to face a tip portion of the metal wire, and a high-voltage generation circuit that applies a high voltage between the metal wire and the electrode.

In one embodiment, the ignition device may include a coil disposed to face a tip portion of the metal wire, and a high-frequency power source that applies an AC voltage to the coil.

In one embodiment, an ignition device may include a laser light source, and an optical system that condenses a beam emitted from the laser light source on a tip portion of the metal wire.

In one embodiment, the ignition device may include a heater having a rocket nozzle facing a tip portion of the metal wire.

In one embodiment, the water vapor generator may reuse heat generated in the combustion chamber to generate water vapor.

In one embodiment, the rocket engine may further include a regenerative cooling channel formed in a wall surface of at least one of the rocket nozzle and the combustion chamber. The water vapor or source liquid water thereof may be supplied to the combustion chamber via the regenerative cooling channel. As a result, the heat generated in the combustion chamber can be reused to warm or vaporize water.

In one embodiment, the water vapor generator may include a heater provided in the combustion chamber and a water supply unit that supplies water droplets to the heater.

In one embodiment, the wire diameter of the metal wire may be 0.05 to 5 mm. The larger the wire diameter of the metal wire, the larger propulsive force is expected, but the larger the heat capacity and the smaller the amount of heat input per unit area. As a result, the rate of temperature rise decreases, and the time required for ignition (ignition time $T_{ig}$) increases. Therefore, the wire diameter of the metal wire can be determined in consideration of the ignition time and the propulsive force, and can be, for example, in the range of 0.05 to 5 mm.

Embodiment

Hereinafter, the present invention will be described based on preferred embodiments with reference to the drawings. The same or equivalent components, members, and processes illustrated in the drawings are denoted by the same reference numerals, and redundant description will be omitted as appropriate. In addition, the embodiment is not intended to limit the invention but is an example, and all features described in the embodiment and combinations thereof are not necessarily essential to the invention.

In addition, dimensions (thickness, length, width, and the like) of each member described in the drawings may be appropriately enlarged and reduced for easy understanding. Furthermore, the dimensions of the plurality of members do not necessarily indicate the magnitude relationship therebetween, and even if a certain member A is drawn thicker than another member B in the drawing, the member A may be thinner than the member B.

FIG. 1 is a diagram illustrating a rocket engine 100 according to an embodiment. The rocket engine 100 includes a combustion chamber 110, a metal wire supply device 120, a water vapor generator 130, a rocket nozzle 140, an ignition device 150, and a sealing mechanism 160. This rocket engine 100 is also referred to as a hybrid thruster.

The metal wire supply device 120 stores the metal wire 2, which is fuel, and supplies the metal wire 2 to the combustion chamber 110. For example, the metal wire 2 is accommodated in a state of being wound around a reel 124. The metal wire supply device 120 includes a feeding mechanism 122 that stably supplies the metal wire 2 from the reel 124 into the combustion chamber 110. The feeding mechanism 122 can be configured by an actuator and a guide.

As the metal wire 2, it is preferable to use a metal material stable at normal temperature, and from this viewpoint, any one of magnesium (Mg), a magnesium alloy, aluminum (A), and an aluminum alloy is suitable.

As the magnesium alloy, an alloy of Mg—Al (AM system), an alloy of Mg—Al—Zn (AZ system), an alloy of Mg—Zn—Zr (ZK system), an alloy of Mg—Cu—Zn (ZC system), an alloy of Mg-rare earth element-Zr (EZ system), an alloy of Mg—Zr-rare earth element-Ag (QE system), an alloy of Mg—Y-rare earth element (WE system), an alloy of Mg—Al—Si (As system), an alloy of Mg—Al-rare earth element (AE system), an alloy of Mg—Mn (M system), and the like are known, and these alloys can be used.

As the aluminum alloy, 1000 series pure aluminum, 2000 series copper (Cu), 3000 series manganese (Mn), 4000 series silicon (Si), 5000 series magnesium (Mg), 6000 series silicon (Si) and magnesium (Mg), and 7000 series zinc (Zn) and magnesium (Mg) are known, and these alloys can be used.

The larger the wire diameter of the metal wire 2, the larger the propulsive force and the longer the ignition time. Therefore, the wire diameter of the metal wire 2 may be designed in consideration of necessary propulsive force and ignition time, and the wire diameter is preferably in the range of 0.05 to 5 mm.

The rocket nozzle 140 is a device that extracts thermal energy from fuel and an oxidant and converts the thermal energy into kinetic energy in a specific direction. The rocket nozzle 140 communicates with the combustion chamber 110. In the combustion chamber 110, a propellant 6 generated by the reaction of the metal wire 2 and water vapor 4 is released from the rocket nozzle 140 into space to generate a propulsive force. The combustion chamber 110 can also be regarded as a part of the rocket nozzle 140.

The sealing mechanism 160 is a mechanism that prevents the combustion gas from leaking to the outside from a place where the metal wire 2 is introduced into the combustion chamber 110 and is typically a combination of a grease seal 162, a mechanical seal 164, a labyrinth seal 166, and the like. The grease seal 162 includes a grease pod and grease filled in the grease pod. The mechanical seal 164 includes, for example, a Teflon sleeve. The labyrinth seal 166 may be made of ceramic.

The water vapor generator 130 generates water vapor 4 serving as an oxidant in the combustion chamber 110. For example, the water vapor generator 130 may include a tank (not shown) that stores liquid water 8 (including impurities), an injection nozzle 132 that supplies the water 8 into the combustion chamber 110, and a heater 134. The heater 134 heats the water 8 in the water vapor generator 130 to vaporize the water 8 to generate water vapor 4. The configuration of the water vapor generator 130 is not limited thereto, and water may be vaporized outside the combustion chamber 110 to supply water vapor into the combustion chamber 110.

A regenerative cooling channel 142 is provided inside or in contact with the rocket nozzle 140 and/or the combustion chamber 110. The liquid water 8 is preferably supplied from the tank to the injection nozzle 132 via the regenerative cooling channel 142. As a result, the heat taken from the rocket nozzle 140 can be used for heating the water 8, and the energy required for vaporizing the water 8 can be reduced.

As described above, since magnesium (Mg), a magnesium alloy, aluminum (A), and an aluminum alloy are stable at room temperature, they do not react with water vapor as an oxidant at room temperature. In order to cause the metal wire 2 to react with water vapor, it is necessary to raise the temperature of the metal wire 2 to an ignition point or higher. The ignition device 150 is a mechanism for heating the metal wire 2 to start a combustion reaction between the metal wire 2 and the water vapor 4. In the present embodiment, the ignition device 150 ignites the metal wire 2 using discharge. The ignition device 150 includes an electrode 151 and a high-voltage generation circuit 152. The electrode 151 is provided to face a tip portion 3 of the metal wire 2. The high-voltage generation circuit 152 applies a high voltage $V_H$ of direct current, alternating current, or pulses between the metal wire 2 and the electrode 151. By the application of the high voltage $V_H$, a strong electric field is generated in the gap between the metal wire 2 and the electrode 151, and dielectric breakdown occurs. The arc discharge due to the dielectric breakdown raises the temperature of the tip portion 3 of the metal wire 2 to a temperature higher than the ignition point.

For example, the high-voltage generation circuit 152 includes a voltage source 153 and a switch SW1. One of the cathode and the anode of the voltage source 153 is connected to the electrode 151, and the other is electrically connected to the metal wire 2. In this example, the roller of the feeding mechanism 122 is formed of metal, and the metal wire 2 and the voltage source 153 are electrically connected via the roller. When the switch SW1 is turned on, the high voltage $V_H$ is applied between the electrode 151 and the metal wire 2.

Figure 2A:
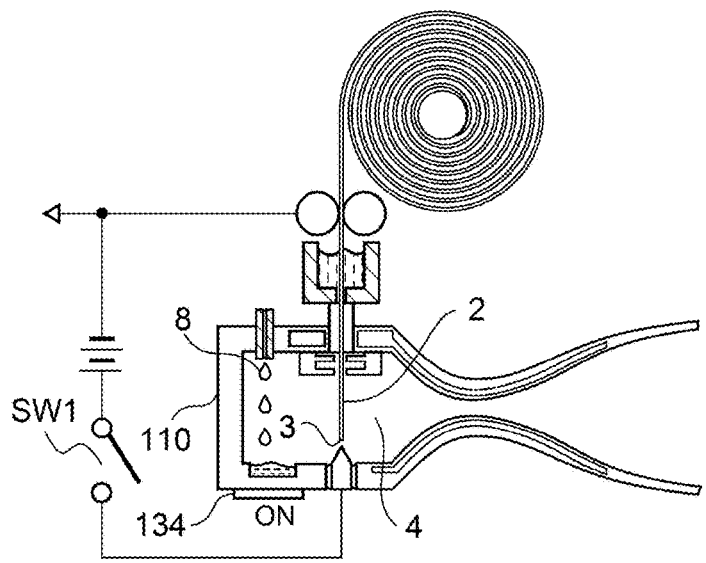
FIG. 2A to FIG. 2C are diagrams for explaining the operation of the rocket engine.
Figure 2B:
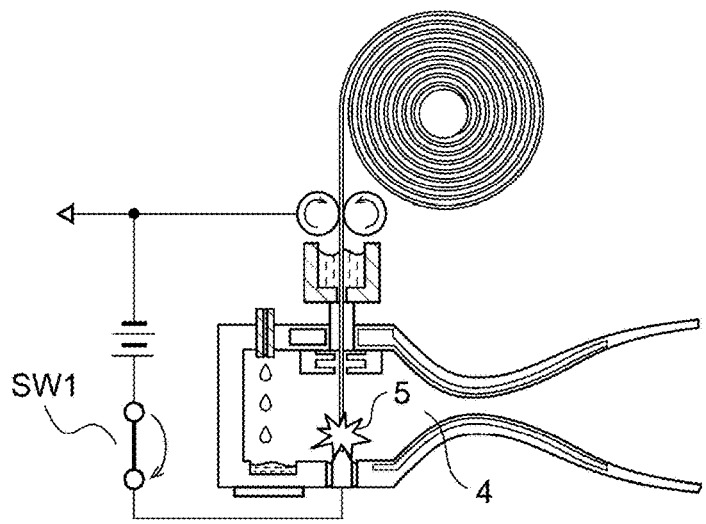
Figure 2C:
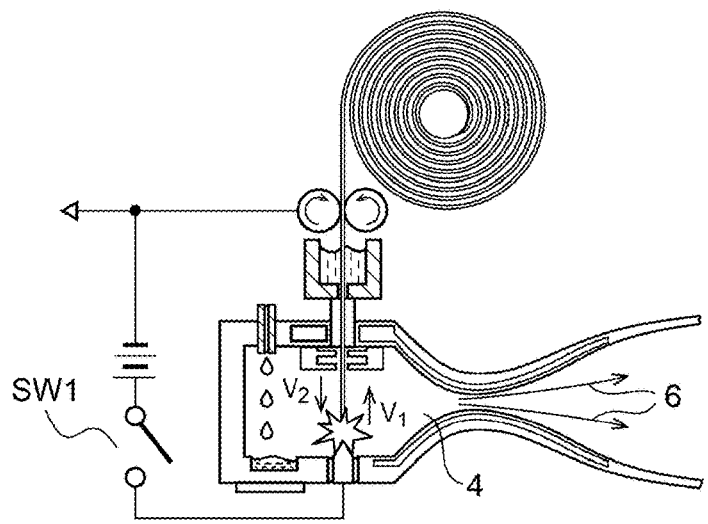

The basic configuration of the rocket engine 100 has been described above. Next, the operation will be described. FIGS. 2A to 2C are diagrams for explaining the operation of the rocket engine 100. FIG. 2A shows a state before ignition. The metal wire supply device 120 feeds the metal wire 2 into the combustion chamber 110 and brings the tip portion 3 close to the electrode 151. The water vapor generator 130 supplies the water 8 into the combustion chamber 110, turns on the heater 134 to heat the water 8, and generates the water vapor 4 in the combustion chamber 110.

Subsequently, the switch SW1 of the ignition device 150 is turned on. As a result, a high voltage is applied between the metal wire 2 and the electrode 151, the arc discharge 5 is generated, the temperature of the metal wire 2 rises, and the reaction between the metal wire 2 and the water vapor 4 starts. When the metal wire 2 is made of magnesium, the reaction formula is expressed as follows.

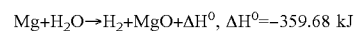

When the metal wire 2 is made of aluminum, the reaction formula is expressed as follows.

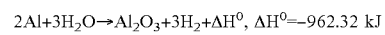

As illustrated in FIG. 2C, when the wire tip portion 3 starts combustion, the combustion surface moves upstream at a certain speed (combustion regression speed) $v_1$. The metal wire 2 is fed from the metal wire supply device 120 at a speed $v_2$ substantially equal to the combustion regression speed $v_1$. By matching the combustion retraction speed $v_1$ with the feed speed $v_2$, the position of the combustion site, that is, the wire tip portion 3 can be kept at a certain position. The propellant 6 generated inside the combustion chamber 110 is released from the rocket nozzle 140 to the outside, and a large reaction heat can be converted into a propulsive force. Note that the switch SW1 may be turned off during combustion. In a case where the propulsion is stopped, the feeding of the metal wire 2 by the metal wire supply device 120 and the supply of the water vapor 4 may be stopped.

The above is the operation of the rocket engine 100. Next, advantages thereof will be described.

As a comparative technique, a hybrid thruster using bulk metal is considered. In the case of using a bulk metal, since the thermal conductivity of the metal is high, even if a reaction occurs at a certain point, heat is three-dimensionally dissipated (or can be said to be due to the size of the heat capacity of the mass), so that it is difficult to maintain the temperature for self-combustion. On the other hand, in the rocket engine 100 according to the present embodiment, the use of the metal wire 2 makes it possible to one-dimensionally suppress the escape of heat and maintain the temperature for self-combustion in the vicinity of the wire tip.

Further, on the other hand, an existing technique using powder as metal is known. In this case, it is also possible to suppress dissipation due to thermal conduction. However, the use of powder has a disadvantage that it is necessary to mount a carrier gas for supply and it is difficult to predict powder supply under a minute weight. Further, there is a disadvantage that the powder metal itself is classified as a dangerous substance in the first place. In the present embodiment, problems in the existing technology can be solved from the viewpoint of combustion maintenance and safety.

A metal wire made of aluminum, magnesium, or an alloy thereof is stably present while being covered with an oxide layer at room temperature but has a property that the wire intensely reacts with the surrounding oxidant (water vapor or the like) as the oxide layer is broken in a high-temperature atmosphere. Therefore, it is excellent from the viewpoint of safety. Water used as an oxidant in the present embodiment is a safe substance. Therefore, realizing the combustion in combination of both by the metal wire mechanism contributes to the safety of the chemical propulsion rocket.

Furthermore, light metal elements such as magnesium and aluminum are present in a large amount as oxides in outer space (Moon, asteroids, and Mars), and water is also attracting attention as a substance that can be collected in space. It can therefore be said that this rocket engine is a chemical propulsion rocket which is compatible with the conditions of the future ISRU.

Combustion Experiment

Figure 3:
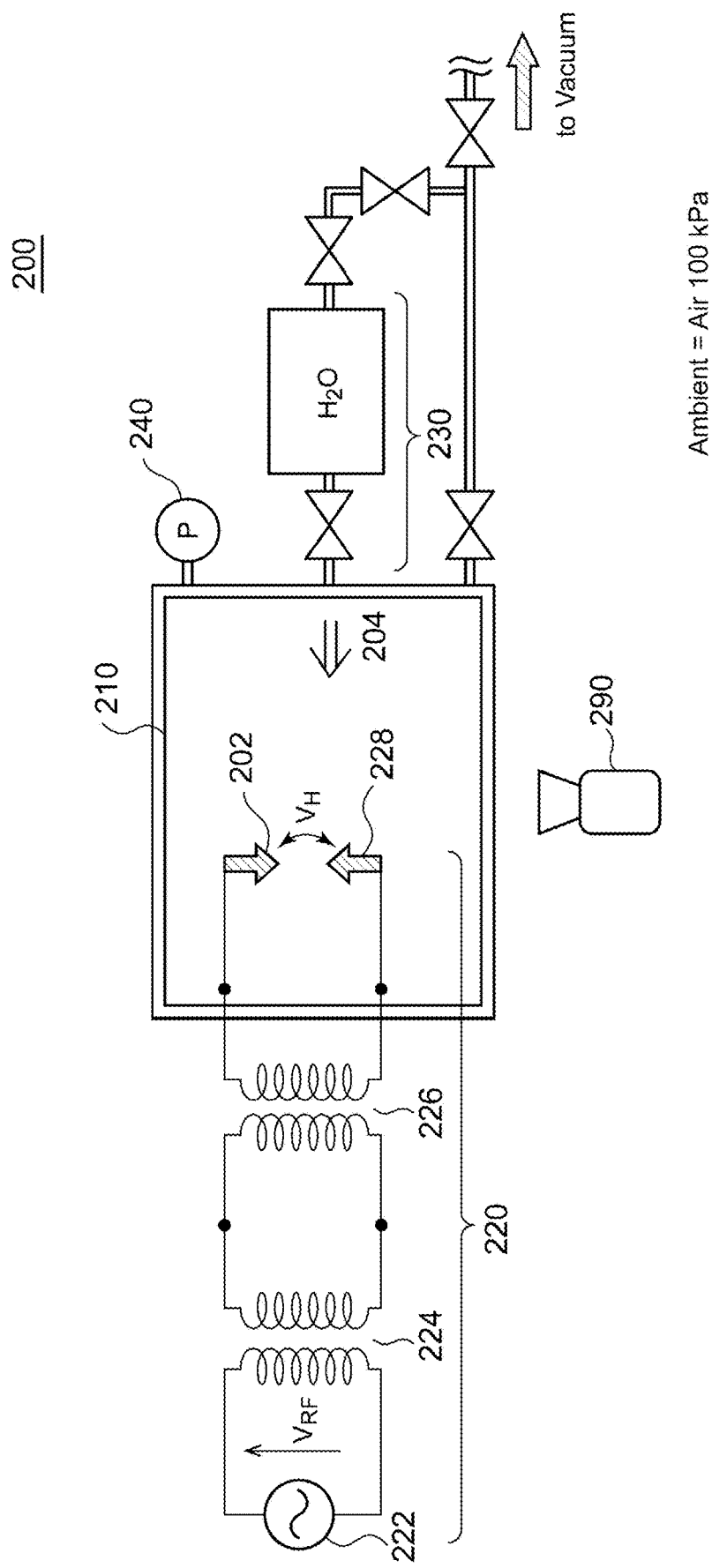
FIG. 3 is a diagram illustrating an experimental device.

A result of a combustion experiment using an experimental device simulating the rocket engine 100 will be described. FIG. 3 is a diagram illustrating an experimental device 200. The experimental device 200 includes a combustion chamber 210, an ignition device 220, a water vapor generator 230, a pressure gauge 240, and a camera 250.

The ignition device 220 includes a high-frequency power source 222, transformers 224 and 226, and an electrode 228. The electrode 228 is provided to face the tip of a metal wire 202. In this experiment, it is assumed that the metal wire 202 is fixed and is not fed. A high-frequency voltage $V_{RF}$ generated by the high-frequency power source 222 is boosted by the transformers 224,226, and an AC high voltage $V_H$ is applied between the metal wire 202 and the electrode 228. As the electrode 228, a $ThO_2$—W alloy (thoriated tungsten) widely used as a discharge electrode was used.

The water vapor generator 230 supplies water vapor 204 controlled to a predetermined pressure into the combustion chamber 210. The pressure gauge 240 measures the internal pressure of the combustion chamber 210. The internal state of the combustion chamber 210 can be photographed by the camera 250.

Experimental parameters are as follows: Magnesium was used as the metal wire 202, and wires having wire diameters of 0.2 mm, 0.5 mm, and 0.8 mm were used. The pressure of the water vapor 204 was changed to 10 kPa, 50 kPa, and 70 kPa. The pressure of the water vapor 204 is controlled by the water temperature and may include an error of about 10%. The distance (gap length) between the electrode 228 and the tip of the metal wire 202 was set to 2 to 5 mm. A high voltage $V_H$ of 8 kV was applied between the electrodes.

Figure 4:
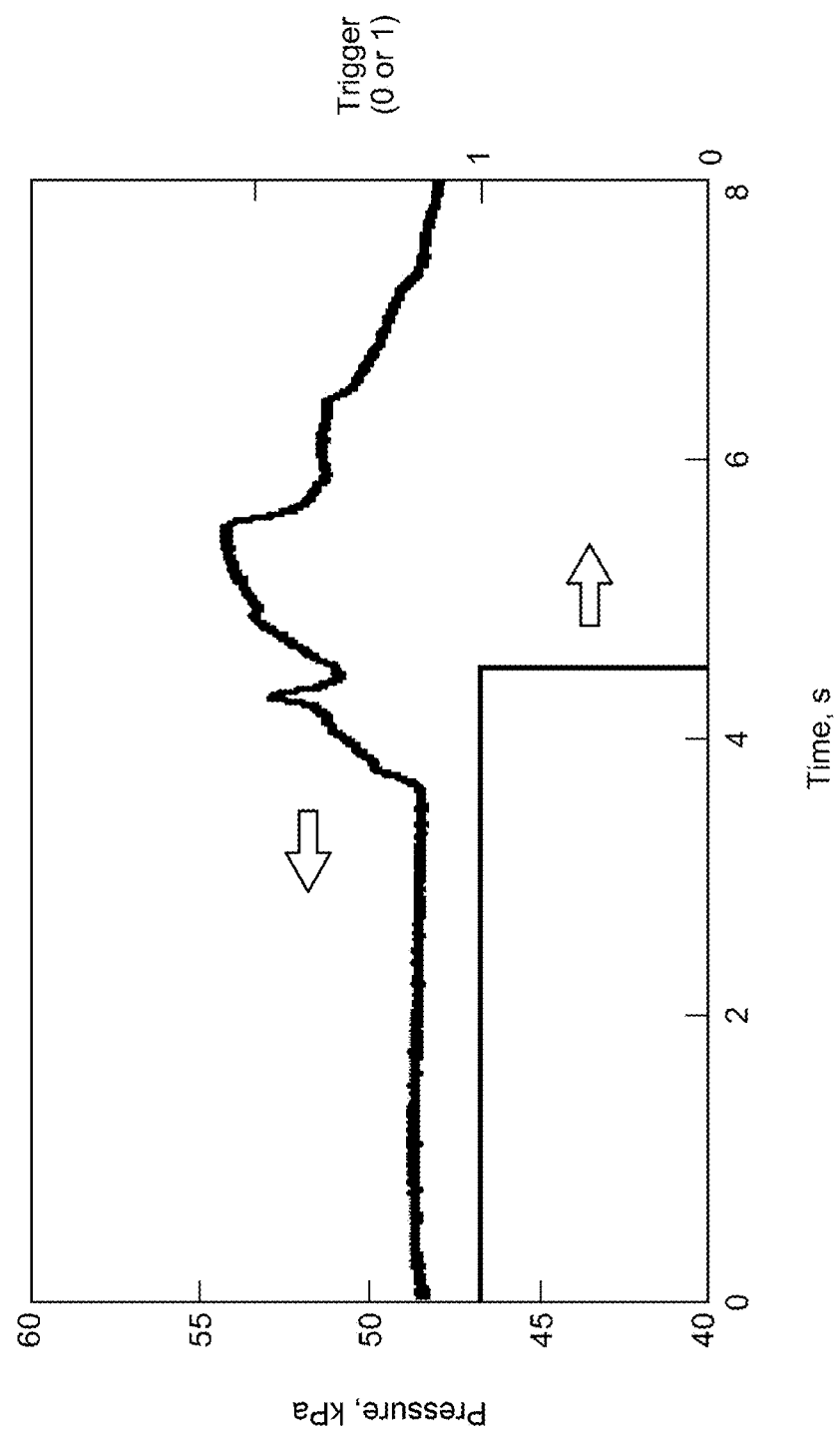
FIG. 4 is a waveform chart showing the pressure in a combustion chamber.

FIG. 4 is a waveform chart illustrating the pressure in the combustion chamber 210. The wire diameter of the metal wire 202 is 0.8 mm, and the water vapor pressure is 50 kPa.

FIG. 4 illustrates a waveform indicating an ignition trigger in addition to the pressure, in which a high voltage $V_H$ is applied between the electrode 228 and the metal wire 202 over a period of 0 to 4.5 seconds at which the trigger is 1.

Since the pressure increases after 3.8 seconds from the start of discharge, the ignition time $T_{ig}$ is 3.8 seconds. Further, since the pressure returns to the original pressure after 7.37 seconds from the start of discharge, the combustion time $T_f$ is 3.57 seconds.

Figure 5:
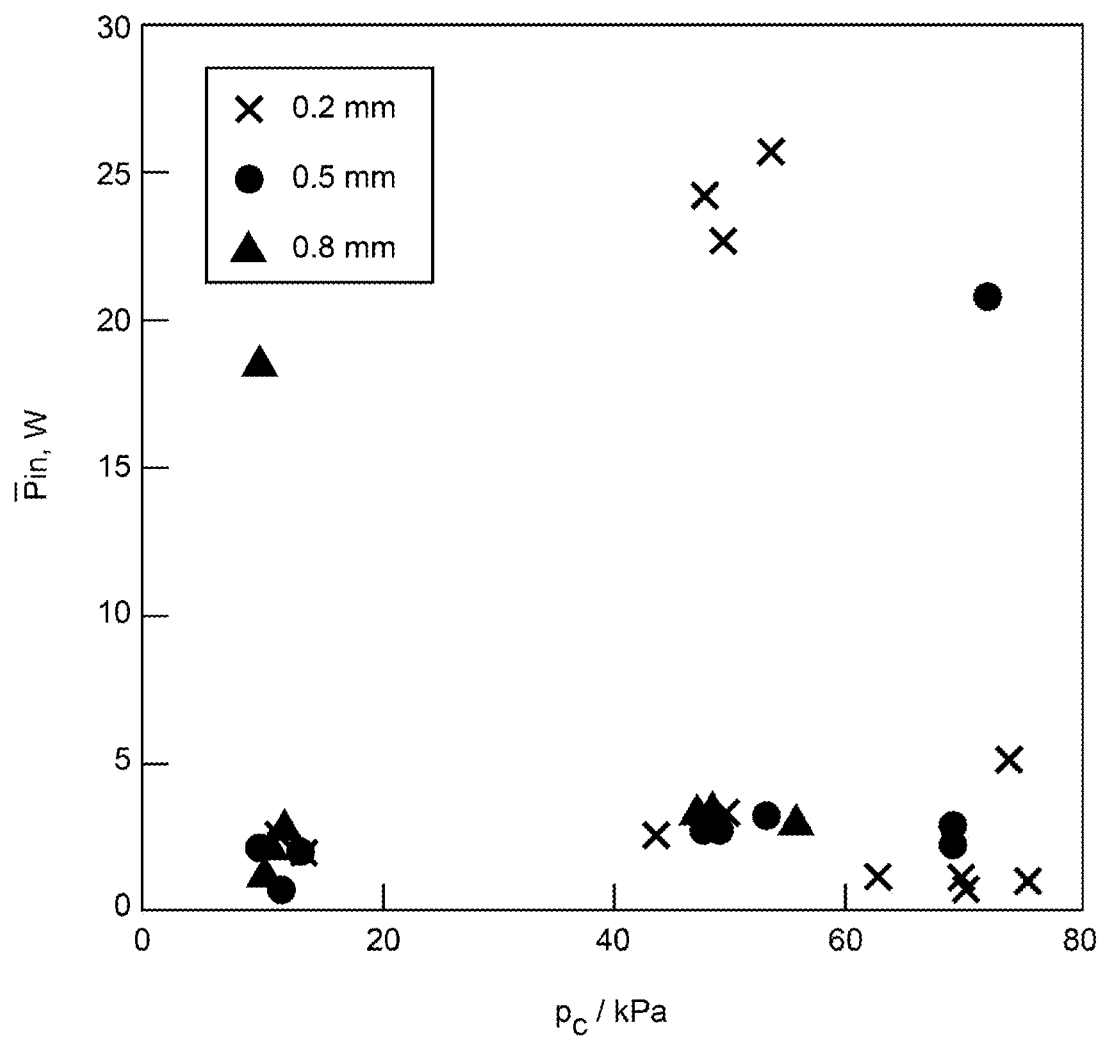
FIG. 5 is a diagram illustrating pressure dependency of input power until ignition.

FIG. 5 is a diagram illustrating pressure dependency of input power until ignition. A plot where the input power exceeds 20 W is due to a measurement error. Therefore, the input power of this ignition device is 5 W or less, which is in a range that can be sufficiently covered by a small spacecraft. From this result, it can be seen that the input power hardly depends on the wire diameter.

Figure 6:
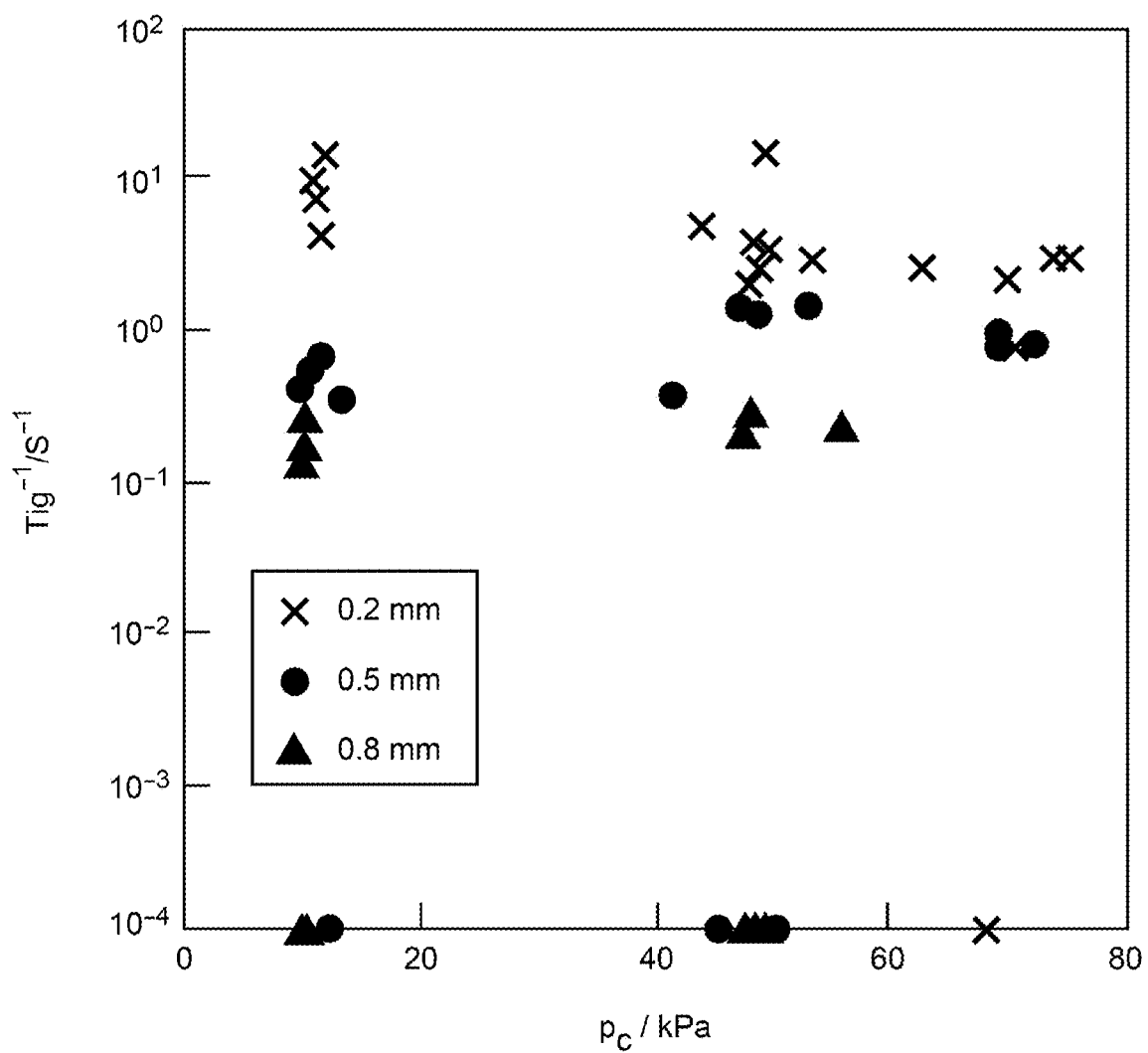
FIG. 6 is a diagram showing the pressure dependency of the reciprocal of an ignition time $T_{ig}$.

FIG. 6 is a diagram illustrating the pressure dependency of the reciprocal ($1/T_{ig}$) of the ignition time $T_{ig}$. The reciprocal of the ignition time $T_{ig}$ is an index indicating the ease of ignition. From this result, it can be seen that the smaller the wire diameter of the metal wire 202, the easier the ignition.

Figure 7A:
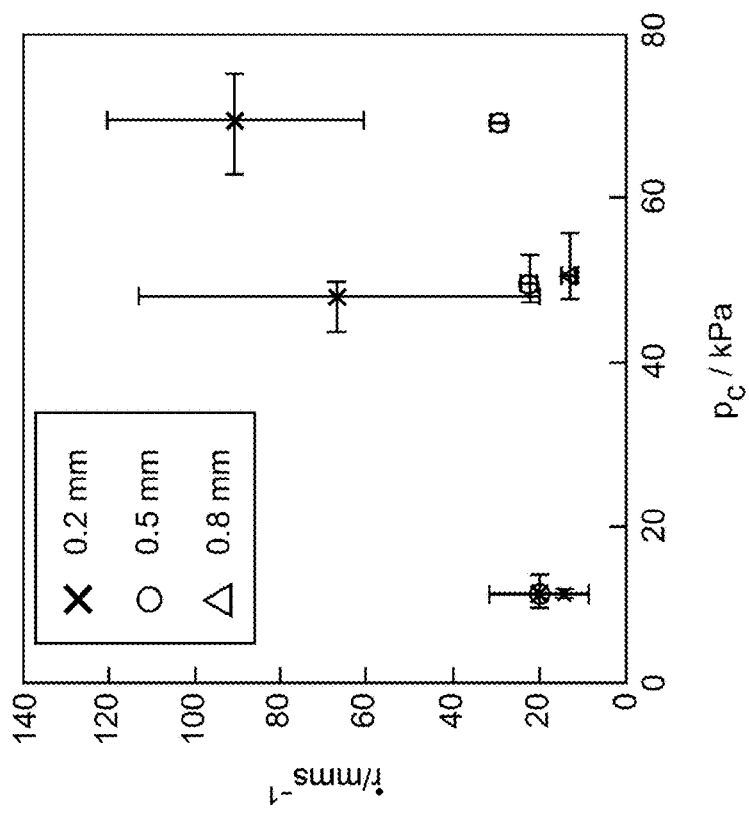
FIG. 7A and FIG. 7B are diagrams illustrating pressure dependency of a combustion regression speed.
Figure 7B:
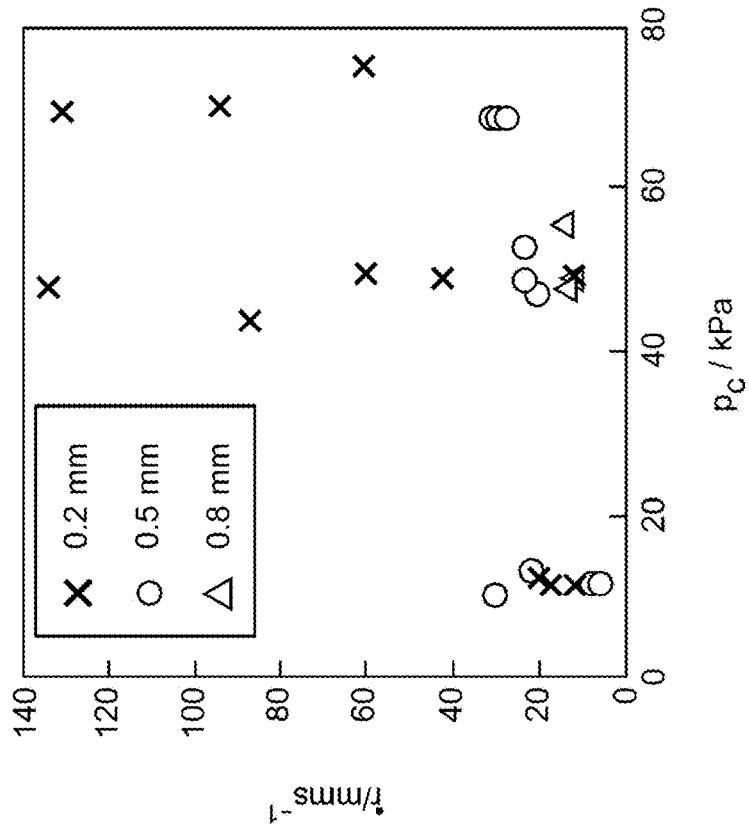

FIGS. 7A and 7B are diagrams illustrating the pressure dependency of the combustion regression speed. The combustion regression speed corresponds to the speed $v_1$ in FIG. 2C. From the results of the wire diameters of 0.5 mm and 0.8 mm, it can be seen that the pressure dependency of the combustion regression speed is small. On the other hand, the variation is large at the wire diameter of 0.2 mm, which is considered to be due to poor estimation accuracy of the combustion time.

When the characteristics when the results obtained from the experimental results are applied to the rocket engine 100 according to the embodiment are estimated, assuming that the mixing ratio O/F is 1.5 and the mass of the small spacecraft is 4 kg in a case where the wire diameter is 0.8 mm and the atmospheric pressure is 50 kPa, the specific impulse is 190 s, the thrust is 26 mN, and the speed increment is 6.3 m/s (500 seconds of combustion). This can be said to be equivalent in performance to existing chemical propulsion devices, and the usefulness of the rocket engine 100 according to the present embodiment has been confirmed.

It is to be understood by those skilled in the art that the above-described embodiments are examples, various modifications can be made to combinations of the respective components and the respective processing processes, and such modifications are also within the scope of the present invention. Hereinafter, such modifications will be described.

First Modification

The ignition means is not limited to discharge, and ignition using induction heating, ignition using laser heating, and ignition using a heater can also be adopted. FIGS. 8A to 8C are views illustrating ignition devices 150A to 150C according to a first modification.

The ignition device 150A of FIG. 8A is of an induction heating type and includes a coil L1 and a high-frequency power source 154. The coil L1 is disposed to face the tip portion 3 of the metal wire 2. The high-frequency power source 154 applies a high-frequency AC voltage $V_{RF}$ to the coil L1. When an alternating current flows through the coil L1, a high-frequency magnetic field B interlinked with the coil L1 is generated. The tip portion 3 of the metal wire 2 is heated by electromagnetic induction by the high-frequency magnetic field B.

The ignition device 150B of FIG. 8B is a laser heating type and includes a laser light source 155 and a condensing optical system 156. The condensing optical system 156 condenses a beam BM emitted from the laser light source 155 on the tip portion 3 of the metal wire 2. Light energy is absorbed by the metal wire 2, and the temperature of the metal wire 2 rises.

The ignition device 150C in FIG. 8C is of a gas torch heating type and includes a heater (torch) 158. The heater 158 has an ignition nozzle 159 facing the tip portion 3 of the metal wire 2. Fuel (for example, $H_2$) is combusted by mixing the fuel with an oxidant (for example, oxygen $O_2$). $H_2$ as a fuel and $O_2$ as an oxidant can be generated by electrolyzing water. As described above, since the oxidant of the hybrid thruster is water (water vapor), the water can be used for the ignition device 150C.

Second Modification

In the embodiment, the liquid water supplied into the combustion chamber 110 is vaporized by the heat of the heater 134, but the present invention is not limited thereto. After the temperature of the wall surface of the combustion chamber is warmed by the combustion gas, liquid water may be vaporized by heat from the wall surface.

Further, water vapor may be generated outside the combustion chamber 110, and the water vapor may be supplied into the combustion chamber 110.

As an intermediate existence between the two, liquid water may be passed through the combustion chamber 110 and the regenerative cooling channel 142 provided inside the wall surface of the rocket nozzle 140, and the water may be vaporized (regenerative cooling) by heat from the combustion gas and sent into the combustion chamber 110.

Third Modification

In the above description, the combustion regression speed $v_1$ is equal to the feeding speed $v_2$ of the metal wire 2, but the present invention is not limited thereto. By providing a difference between both the speeds $v_1$ and $v_2$, it is also possible to perform combustion in the vicinity of the wall surface of the combustion chamber 110 or perform pulsating combustion.

Fourth Modification

Reignition in which the rocket engine 100 is once ignited and propelled, then the rocket engine 100 is stopped, and then the rocket engine 100 is ignited again is also an important technology. When the metal wire 2 is combusted, cinders may remain in the tip portion 3, or an oxide film may adhere to the tip portion 3, so that reignition may be difficult. As a countermeasure, the rocket engine 100 may include a wire cutter that cuts off the tip of the metal wire 2 before reignition or after combustion is stopped to expose a new tip surface.

Fifth Modification

In the embodiment, the metal wire 2 is accommodated in a state of being wound around the reel, but the present invention is not limited thereto, and a rod-shaped metal wire 2 may be used. In addition, the material of the metal wire 2 is not limited to those described above and can be replaced with a new material that can be used in the future.

Although the present invention has been described using specific terms based on the embodiments, the embodiments merely illustrate the principle and application of the present invention, and many modifications and changes in arrangement are recognized in the embodiments without departing from the spirit of the present invention defined in the claims.

What is claimed is:

1. A rocket engine comprising:
   a combustion chamber;
   a metal wire supply device structured to supply a solid metal wire which is fuel to the combustion chamber;
   a water vapor generator structured to supply water vapor which is oxidant to the combustion chamber;
   an ignition device structured to ignite the metal wire; and
   a rocket nozzle structured to communicate with the combustion chamber, wherein the ignition device comprises:
   an electrode disposed to face a tip portion of the metal wire; and
   a high-voltage generation circuit structured to apply a high voltage between the metal wire and the electrode.

2. The rocket engine according to claim 1, wherein the metal wire is any one of magnesium, a magnesium alloy, aluminum, and an aluminum alloy.

3. The rocket engine according to claim 1, further comprising:
   a regenerative cooling channel formed in a wall surface of at least one of the rocket nozzle and the combustion chamber, wherein
   the water vapor or source liquid water thereof is supplied to the combustion chamber via the regenerative cooling channel.

4. The rocket engine according to claim 1, wherein the water vapor generator comprises:
   a heater provided in the combustion chamber; and
   a water supply unit structured to supply water droplets to the heater.

5. The rocket engine according to claim 1, wherein the water vapor generator reuses heat generated in the combustion chamber to generate water vapor.

6. The rocket engine according to claim 1, wherein the metal wire supply device accommodates the metal wire in a state of being wound around a reel.

7. The rocket engine according to claim 1, further comprising:
   a sealing mechanism provided in an insertion portion of the combustion chamber in which the metal wire is inserted.

8. The rocket engine according to claim 1, wherein a wire diameter of the metal wire is 0.05 to 5 mm.

* * * * *